United States Patent
Harbers et al.

(10) Patent No.: US 9,930,741 B2
(45) Date of Patent: Mar. 27, 2018

(54) SYNCHRONIZED LIGHT CONTROL OVER A WIRELESS NETWORK

(71) Applicant: Xicato, Inc., San Jose, CA (US)

(72) Inventors: Gerard Harbers, Sunnyvale, CA (US); Barry Mark Loveridge, San Jose, CA (US); Martin Emil Mueller, Fremont, CA (US); Jeffrey P. Hushley, Kailua, HI (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 15/055,298

(22) Filed: Feb. 26, 2016

(65) Prior Publication Data

US 2016/0255698 A1 Sep. 1, 2016

Related U.S. Application Data

(60) Provisional application No. 62/126,341, filed on Feb. 27, 2015, provisional application No. 62/145,406, filed on Apr. 9, 2015.

(51) Int. Cl.
H05B 33/08 (2006.01)
H05B 37/02 (2006.01)
(Continued)

(52) U.S. Cl.
CPC ..... *H05B 33/0854* (2013.01); *H04L 43/0852* (2013.01); *H05B 33/0803* (2013.01);
(Continued)

(58) Field of Classification Search
None
See application file for complete search history.

(56) References Cited

U.S. PATENT DOCUMENTS 5,959,316 A 9/1999 Lowery
6,351,069 B1 2/2002 Lowery et al.
(Continued)

FOREIGN PATENT DOCUMENTS

EP 2401895 A1 1/2012
EP 2739020 A2 6/2014
(Continued)

OTHER PUBLICATIONS

Invitation to Pay Additional Fees dated Jun. 1, 2016 for International Application No. PCT/US2016/20050 filed on Feb. 29, 2016 by Xicato, Inc., 9 pages.

(Continued)

*Primary Examiner* — Jany Richardson
(74) *Attorney, Agent, or Firm* — Silicon Valley Patent Group LLP

(57) ABSTRACT

A light control and data interface module (LCDIM) is used to control an LED based illumination device. The LCDIM includes a transceiver that receives communication signals from one or more sensor modules. The signals may include an indication of an identity of the one or more sensor modules and elapsed time since a triggering event was detected. One or more processors are configured to receive the communication signal and to determine a delay time to trigger a lighting control response. The one or more processors are further configured to cause the transmission of a command signal to a power converter coupled to the LCDIM to implement the lighting control response.

17 Claims, 10 Drawing Sheets

(51) Int. Cl.
*H04L 12/26* (2006.01)
*H04W 56/00* (2009.01)
*H04W 84/18* (2009.01)
*F21S 2/00* (2016.01)
*F21V 23/04* (2006.01)

(52) U.S. Cl.
CPC ..... H05B 33/0872 (2013.01); H05B 37/0218 (2013.01); H05B 37/0227 (2013.01); H05B 37/0236 (2013.01); H05B 37/0272 (2013.01); H05B 37/0281 (2013.01); *F21S 2/00* (2013.01); *F21V 23/045* (2013.01); *H04W 56/0015* (2013.01); *H04W 84/18* (2013.01)

(56) References Cited

U.S. PATENT DOCUMENTS

| | | | |
|---|---|---|---|
| 6,504,301 B1 | 1/2003 | Lowery | |
| 6,586,882 B1 | 7/2003 | Harbers | |
| 6,600,175 B1 | 7/2003 | Baretz et al. | |
| 6,680,569 B2 | 1/2004 | Mueller-Mach et al. | |
| 6,812,500 B2 | 11/2004 | Reeh et al. | |
| 7,126,162 B2 | 10/2006 | Reeh et al. | |
| 7,250,715 B2 | 7/2007 | Mueller et al. | |
| 7,479,662 B2 | 1/2009 | Soules et al. | |
| 7,564,180 B2 | 7/2009 | Brandes | |
| 7,614,759 B2 | 11/2009 | Negley | |
| 7,629,621 B2 | 12/2009 | Reeh et al. | |
| 2007/0081336 A1 | 4/2007 | Bierhuizen et al. | |
| 2008/0143273 A1 | 6/2008 | Davidson et al. | |
| 2011/0305200 A1* | 12/2011 | Schoofs | H05B 37/0245 370/328 |
| 2012/0212156 A1* | 8/2012 | Saes | H05B 37/0245 315/312 |
| 2013/0165044 A1 | 6/2013 | Xie et al. | |
| 2016/0255704 A1 | 9/2016 | Mueller et al. | |

FOREIGN PATENT DOCUMENTS

| | | |
|---|---|---|
| JP | 2001093675 A | 4/2001 |
| WO | WO2010097742 A1 | 9/2010 |
| WO | WO2011053132 A2 | 5/2011 |

OTHER PUBLICATIONS

Machine translation in English of Abstract for JP2001093675 visited at www.espacenet.com on Jul. 30, 2016, 2 pages.
International Search Report and Written Opinion dated May 25, 2016 for International Application No. PCT/US2016/020052 filed on Feb. 29, 2016 by Xicato, Inc., 14 pages.
International Search Report and Written Opinion dated Aug. 16, 2016 for International Application No. PCT/US2016/20050 filed on Feb. 29, 2016 by Xicato, Inc., 17 pages.

* cited by examiner

SYNCHRONIZED LIGHT CONTROL OVER A WIRELESS NETWORK

CROSS REFERENCE TO RELATED APPLICATIONS

This application claims priority under 35 USC 119 to U.S. Provisional Application No. 62/126,341, filed Feb. 27, 2015, and to U.S. Provisional Application No. 62/145,406, filed Apr. 9, 2015, both of which are incorporated by reference herein in their entireties.

TECHNICAL FIELD

The described embodiments relate to LED based illumination devices that include Light Emitting Diodes (LEDs).

BACKGROUND

The use of LEDs in general lighting is becoming more desirable. Typically, LED illumination devices are stand-alone units. It is desirable, however, to control a plurality of LED illumination devices.

SUMMARY

A light control and data interface module (LCDIM) is used to control an LED based illumination device. The LCDIM includes a radio frequency transceiver that receives communication signals from one or more sensor modules. The signals may include an indication of an identity of the one or more sensor modules and elapsed time since a triggering event was detected. One or more processors are configured to receive the communication signal and to determine a delay time to trigger a lighting control response. The one or more processors are further configured to cause the transmission of a command signal to a power converter coupled to the LCDIM to implement the lighting control response.

In one implementation, a light control and data interface module includes one or more processors; a transceiver configured to receive a first communication signal from one or more sensor modules, the first communication signal including an indication of an identity of the one or more sensor modules and a first elapsed time since a triggering event was detected by the one or more sensor modules; and a non-transitory, computer readable medium storing instructions that when executed by the one or more processors cause the one or more processors to: receive the first communication signal from the transceiver; determine a delay time to trigger a lighting control response based on a difference between a desired delay time to trigger the lighting control response and the first elapsed time; and transmit a command signal that implements the lighting control response to a power converter coupled to the light control and data interface module after the delay time to trigger the lighting control response has elapsed, wherein the power converter is configured to supply an electrical current to an LED based light engine in response to the command signal.

DETAILED DESCRIPTION

Reference will now be made in detail to background examples and some embodiments of the invention, examples of which are illustrated in the accompanying drawings.

Figure 1:
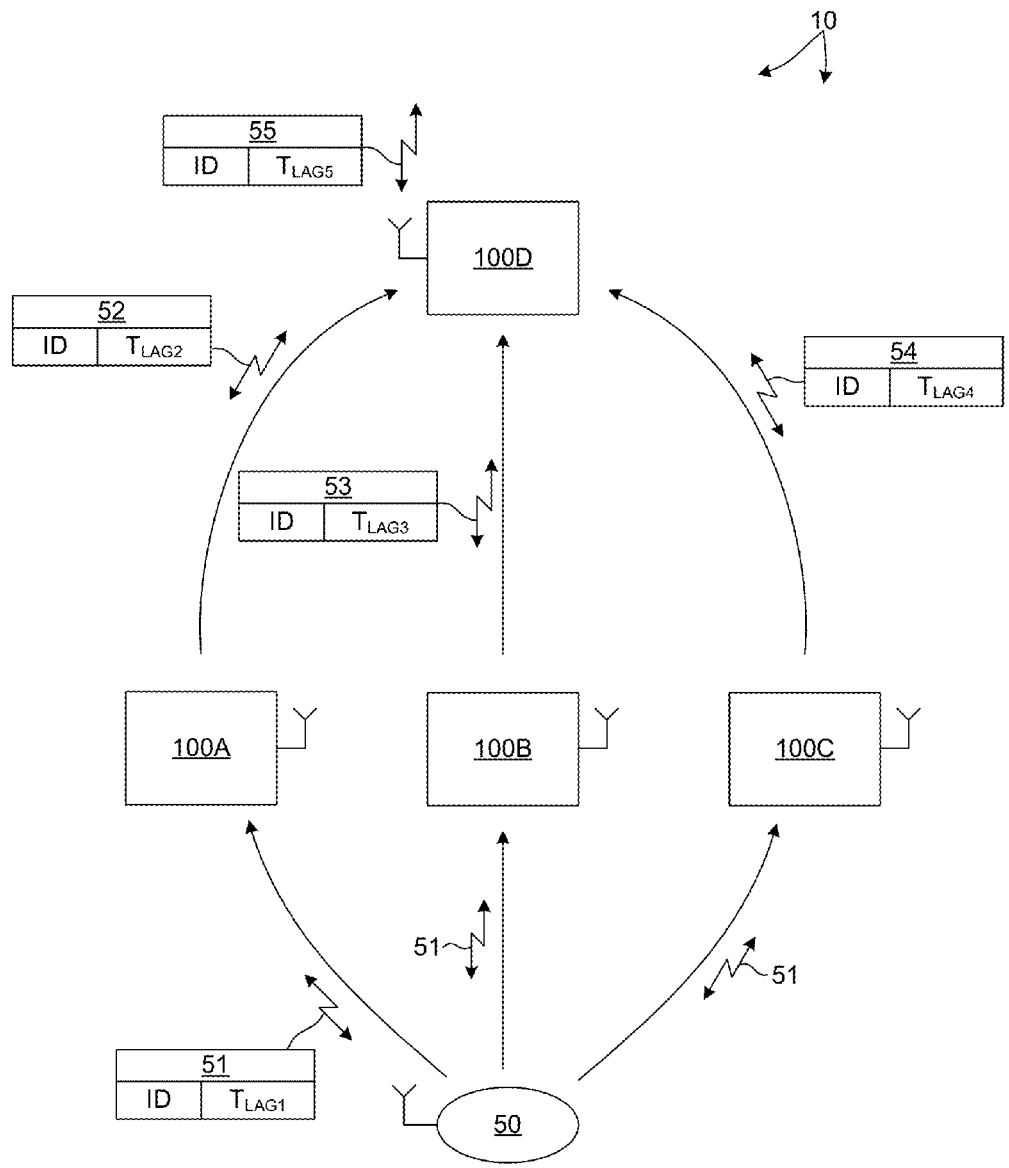
FIG. 1 depicts a lighting control network in an exemplary, non-limiting embodiment.

FIG. 1 depicts a lighting control network 10 in an exemplary, non-limiting embodiment. Lighting control network 10 is configured as a wireless network (e.g., Bluetooth Smart, Bluetooth Low Energy, etc.) that includes environmental sensor module 50 and LED based illumination devices 100A-D. In one aspect, the LED based illumination devices respond to signals received from one or more environmental sensors based on rules stored on board each LED based illumination device. In this manner, the intelligence of the lighting control network resides in the LED based illumination devices, but the signals that trigger responses from the illumination devices originate from one or more sensors communicatively coupled to the LED based illumination devices.

In another aspect, the response of each individual LED based illumination device to a particular sensor signal is synchronized in time with the responses of every other individual LED based illumination device within a predefined group to ensure a coordinated, uniform illumination response. By synchronizing the response of each LED based illumination device in a group, a desirable light effect is achieved. In some embodiments, this is achieved without resorting to synchronization of every networked device (i.e., sensor modules and LED based illumination devices) to a network time reference. This reduces network overhead associated with maintaining time across each device in the network. In some other embodiments, a global time base is employed and the LED based illumination devices in a lighting control group maintain an accurate measure of time, for example, by periodic recalibration with a global time reference. A trigger signal (e.g., communication from an environmental sensor) requiring a synchronized response among any number of LED based illumination devices in a lighting control network simply needs to refer to a particular time of the triggering event referenced to the global time base. Since all LED based illumination devices are synchronized to the global time base, their respective responses to the trigger signal will also be synchronized in time based on pre-programmed rules associated with the response of each LED based illumination device to the triggering event.

The communication of signals between sensor module 50 and each LED based illumination device 100A-D may take a different amount of time in a wireless network. The wireless network may require multiple transmissions of the same signal to reach each LED based illumination device in the group. The latency associated with each transmission may be different. Without synchronization, different LED based illumination devices may initiate an illumination response to the received sensor signals at different times. This may result in a visible lack of uniformity in the light effect. One manifestation of this effect is commonly referred to as a "popcorn" response where lights in a room appear to change intensity in a random pattern that users find unpleasant.

In the lighting control network 10 depicted in FIG. 1, an environmental sensor module 50 detects an environmental event (e.g., presence, movement, sound, temperature, vibration, user control, etc.) and wirelessly transmits a signal 51 that includes an indication of the identity of the sensor module, an indication of the triggering event, and an amount of time that has elapsed between the recognition of the triggering event by the sensor module and the time of transmission of the signal 51. This time, $T_{LAG1}$, represents an approximation of the latency associated with the communication of the triggering event by the sensor module. Signal 51 is broadcast wirelessly and is received by LED based illumination devices 100A, 100B, and 100C, but not LED based illumination device 100D.

In some embodiments, successive transmissions of signals indicative of the triggering event may be made. Each successive transmission by sensor module 50 includes the identity of the sensor module, the indication of the triggering event, and an amount of time that has elapsed between the recognition of the triggering event by the sensor module and the time of transmission associated with each successive signal. In this manner, any signal transmission by sensor module 50 indicative of a triggering event includes an approximation of the latency associated with the communication of the triggering event by the sensor module.

In turn, LED based illumination device 100A broadcasts signal 52 to effectively relay the message from sensor module 50. To maintain synchronization, signal 52 includes an indication of the identity of the sensor module 50, the indication of the triggering event, and an amount of time that has elapsed between the recognition of the triggering event by the sensor module and the time of transmission of the signal 52. This time, TLAG2, represents an approximation of the latency associated with the communication of the triggering event by the sensor module and the latency associated with the communication of the triggering event by LED based illumination device 100A. Signal 52 is broadcast wirelessly and is received by LED based illumination device 100D.

Similarly, LED based illumination device 100B broadcasts signal 53 to effectively relay the message from sensor module 50. To maintain synchronization, signal 53 includes an indication of the identity of the sensor module 50, the indication of the triggering event, and an amount of time that has elapsed between the recognition of the triggering event by the sensor module and the time of transmission of the signal 53. This time, $T_{LAG3}$, represents an approximation of the latency associated with the communication of the triggering event by the sensor module and the latency associated with the communication of the triggering event by LED based illumination device 100B. In addition, LED based illumination device 100C broadcasts signal 54 to effectively relay the message from sensor module 50. To maintain synchronization, signal 54 includes an indication of the identity of the sensor module 50, the indication of the triggering event, and an amount of time that has elapsed between the recognition of the triggering event by the sensor module and the time of transmission of the signal 54. This time, $T_{LAG4}$, represents an approximation of the latency associated with the communication of the triggering event by the sensor module and the latency associated with the communication of the triggering event by LED based illumination device 100C.

LED based illumination device 100D receives signals 52, 53, and 54 that each communicate the same triggering event along with the latency associated with each respective communication path. In some embodiments, LED based illumination device 100D receives the first message indicative of the triggering event and ignores the subsequent messages associated with the same triggering event (e.g., subsequent messages referencing the same event number). Assuming that signals 52 is received first, it follows that signals 53 and 54 are ignored.

In turn, LED based illumination device 100D broadcasts signal 55 to effectively relay the message from sensor module 50. To maintain synchronization, signal 55 includes an indication of the identity of the sensor module 50, the indication of the triggering event, and an amount of time that has elapsed between the recognition of the triggering event by the sensor module and the time of transmission of the signal 55. This time, $T_{LAG5}$, represents a summation of the latency associated with the communication of the triggering event by the sensor module, the latency associated with the communication of the triggering event by LED based illumination device 100A, and the latency associated with the communication of the triggering event by LED based illumination device 100D.

In some embodiments, the estimate of communication latency associated with each message is determined based on the number of communication hops and the elapsed time associated with each hop. In some other embodiments, the estimate of communication latency associated with each message is determined based on a predetermined calibration table that assigns a particular latency to each pair of nodes in the lighting control network. In some other embodiments, the estimate of communication latency associated with each message is determined based on the number of packets buffered at each receiving node.

In general, communication latency may be expressed directly as an elapsed time, or alternatively an alternative, indirect indication of time may be employed.

In one aspect, the delays may be dynamically set based on the nodes receiving various packets with delays. For example, a node will likely see a re-broadcast of its original message with some added delay. As the node initiated the message, the node will be aware of the actual delay and, accordingly, can determine the error in delay. If the error is too large, e.g., greater than a threshold, the node may report the error back to the network, which may then adjust parameters to minimize the error. The dynamically set delay may be particularly useful, e.g., to set up the network up initially, i.e. program in the node delays.

In another aspect, each of the LED based illumination devices 100A-D is programmed to initiate a change in the light emitted from each LED based illumination device after a fixed amount of time has elapsed from the moment that the triggering event was recognized by the sensor module. In one example, each of the LED based illumination devices 100A-D is programmed to initiate a fade-on after 500 milliseconds has elapsed from the moment that the triggering event was recognized by the sensor module. In addition, $T_{LAG1}$ is 200 milliseconds, $T_{LAG2}$ is 400 milliseconds, $T_{LAG3}$ is 420 milliseconds, and $T_{LAG4}$ is 450 milliseconds. LED based illumination devices 100A-C receive signal 51 and determine the difference between the desired 500 millisecond lag and the 200 millisecond latency associated the communication of signal 51 by sensor module 50. As a result, LED based illumination devices 100A-C allow 300 milliseconds to elapse between receiving signal 51 and initiating the fade-on of each respective light emitting device. Similarly, LED based illumination device 100D receives signal 52 and determines the difference between the desired 500 millisecond lag and the 400 millisecond latency associated the communication of signal 52 by LED based illumination device 100A. As a result, LED based illumination device 100D allows 100 milliseconds to elapse between receiving signal 52 and initiating the fade-on of the light emitting device. In this manner, the illumination response by each of LED based illumination devices 100A-D is initiated at the same time despite the fact that one or more of the LED based illumination devices receiving signals indicative of the triggering event at one or more different times.

In general, the initiation of a change in the light emitted from each LED based illumination device may be coordinated with the other LED based illumination devices in the lighting control network in any desired manner. For example, all of the LED based illumination devices in the lighting control network may be configured to fade to a particular light level starting at the same time. In some other examples, one or more of the LED based illumination devices in the lighting control network may be configured to fade to a particular light level starting at different, predetermined elapsed times, for example, to progressively "turn on" lights down a hallway.

In a further aspect, if an LED based illumination device does not receive the trigger signal from the environmental sensor input until after the predetermined response time has already elapsed, an alternative, "catch-up," response may be used. For example, an LED based illumination device may not receive a signal indicative of the trigger event until after the desired 500 millisecond lag. The alternative, catch-up response utilized may depend on amount of time between the specified response time and the event. For example, if the time between the specified response time and the event is relatively small compared to the fade time, e.g., a threshold of less than 25% of the fade time may be used, the LED based illumination device may reduce the fade time so that the LED based illumination device reaches the final intensity at the same time as the other LED based illumination devices. In another example, if the time between the specified response time and the event is greater than the define threshold, the LED based illumination device may turn on at a slower fade rate (e.g., 2× specified time) to make the late transition as unobtrusive as possible.

Figure 2:
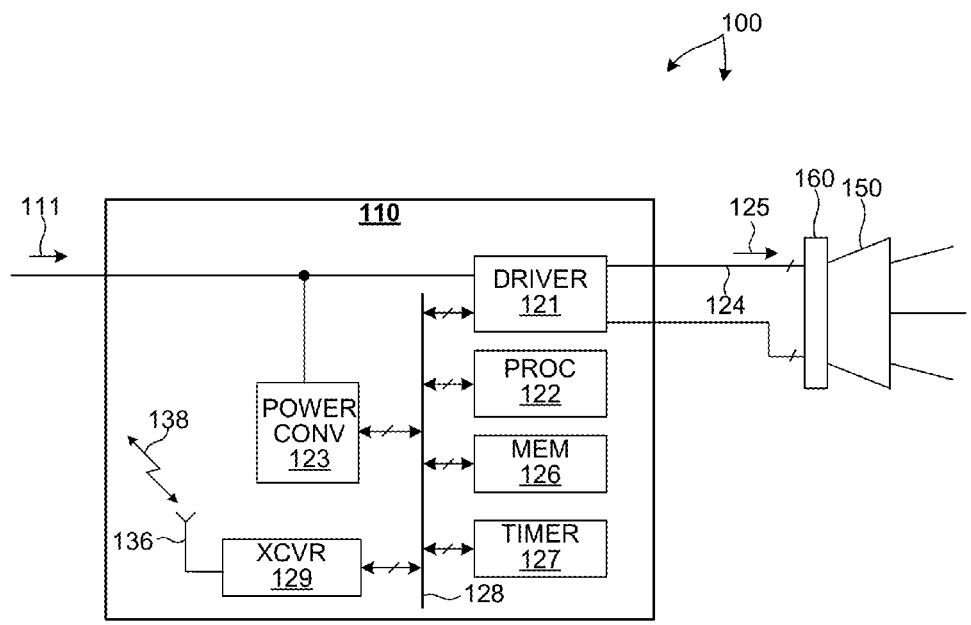
FIG. 2 depicts an exemplary LED based illumination device that includes a Light Control and Data Interface Module (LCDIM) configured to supply electrical power to an LED based light engine.

FIG. 2 depicts an exemplary LED based illumination device 100 with a reflector 150 and that includes a Light Control and Data Interface Module (LCDIM) 110 configured to supply electrical power to an LED based light engine 160. In addition, LCDIM 110 also integrates light control, power conversion, data acquisition, data processing, and communication capability.

In the embodiment depicted in FIG. 2, LCDIM 110 includes an LED driver 121, one or more power converter 123, one or more radio frequency transceiver 129, one or more processors 122, one or more memory 126, and one or more timer 127 configured to communicate over bus 128.

Figure 6:
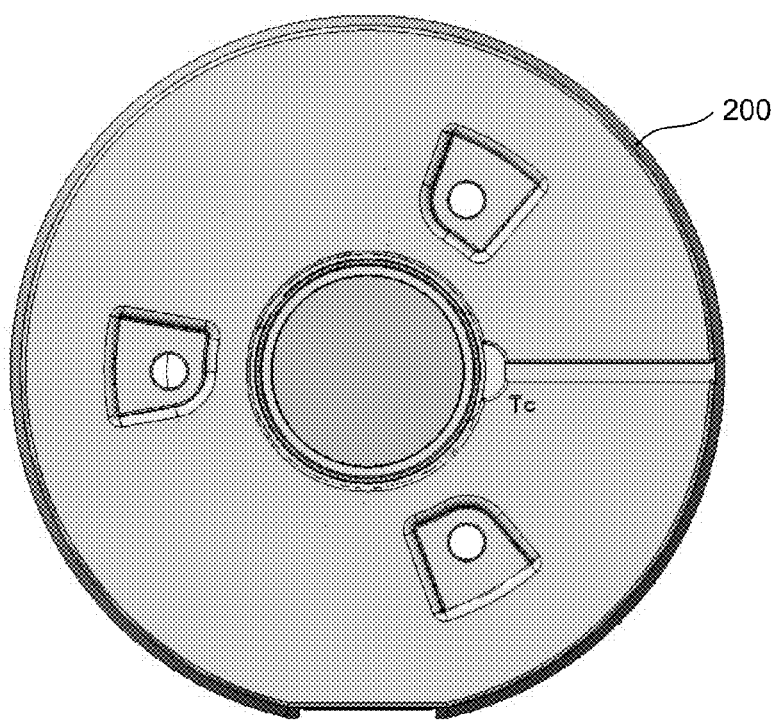
FIGS. 6 and 7 depict a top view and a side view, respectively, of an LED based illumination device including a LCDIM.
Figure 7:
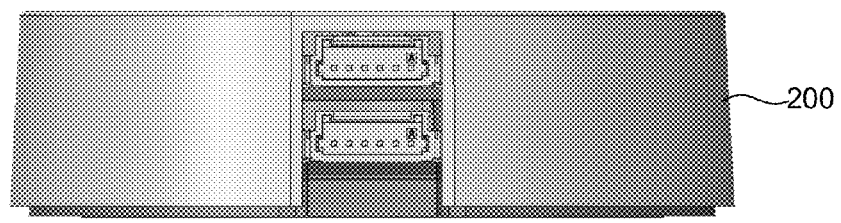

FIGS. 6 and 7 depict a top view and a side view, respectively, of an LED based illumination device 200 including a LCDIM. An example of such a lighting device is the Xicato Intelligent Module (XIM) manufactured by Xicato, Inc., San Jose, Calif. (USA).

Figure 8:
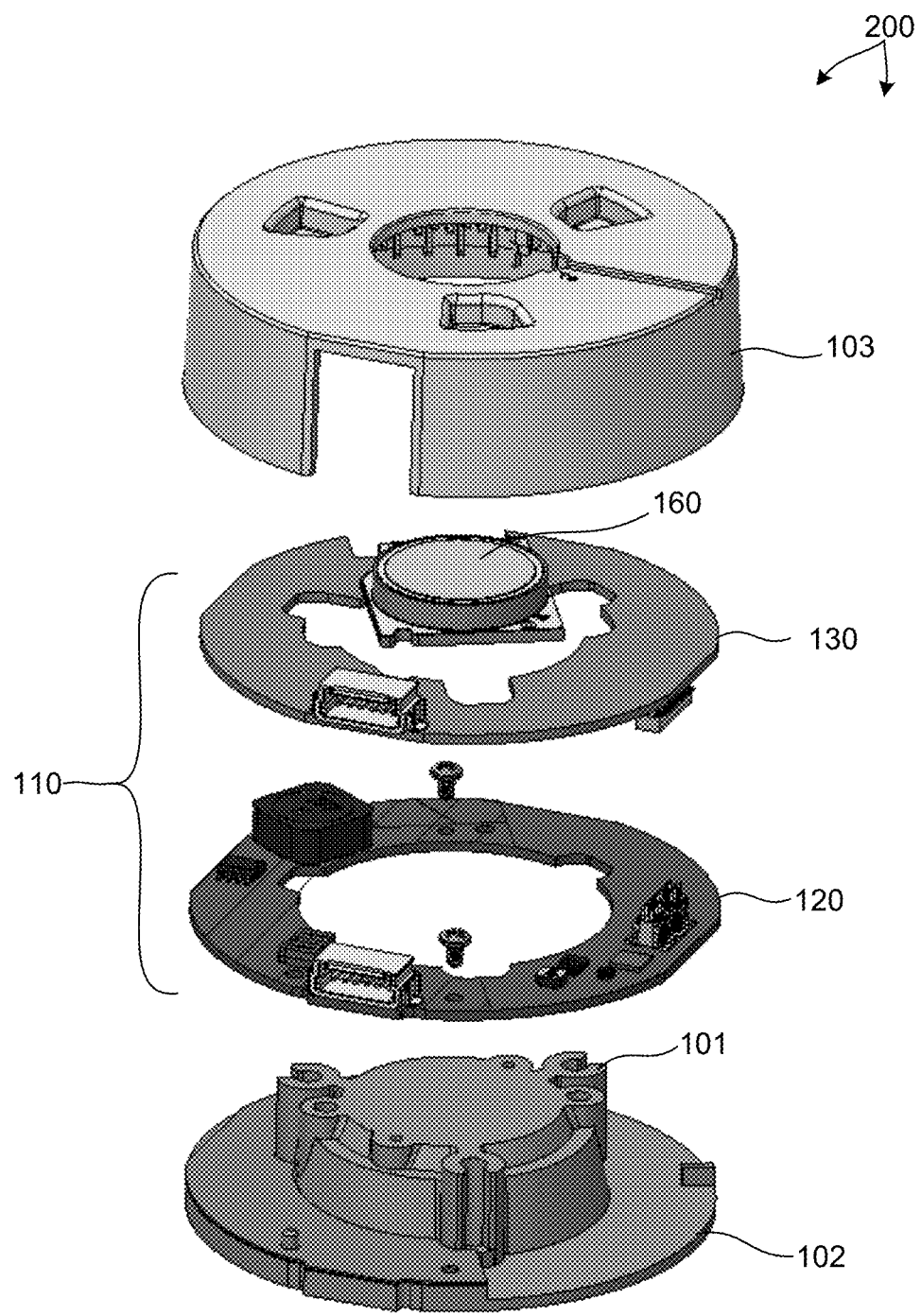
FIG. 8 depicts an exploded view illustrating components of LED based illumination device as depicted in FIGS. 2-3.

FIG. 8 depicts an exploded view illustrating components of LED based illumination device 200 as depicted in FIG. 2. As depicted in FIG. 8, LED based illumination device 200 includes LED based light engine 160, LCDIM 110, including primary ECB 120 and peripheral ECB 130, heat sink 101, mounting plate 102, and housing 103.

The assembled LED based illumination device 200 mechanically integrates the LED based light engine with the LCDIM within a common housing. However, in general, one or more components of LED based illumination device 200 may be mechanically separated from the others. In these embodiments, one or more components may be separately located on a light fixture and electrically coupled to the other components by suitable wiring and connectors. In some embodiments, LED based light engine 160 is assembled within a simple housing to facilitate attachment to a heat sink. An example of such a lighting device is the Xicato Thin Module (XTM) manufactured by Xicato, Inc., San Jose, Calif. (USA). In this example, one or more components of LCDIM 110 are packaged in a separate housing, and this assembly is electrically coupled to the LED based light engine by a wired connection.

It should be understood that as defined herein an LED based illumination device is not an LED, but is an LED light source or fixture or component part of an LED light source or fixture. As depicted in FIG. 8, LED based illumination device 200 includes an LED based light engine 160 configured to generate an amount of light. LED based light engine 160 is coupled to heat sink 101 to promote heat extraction from LED based light engine 160. Primary ECB 120 and peripheral ECB 130 are shaped to fit around heat sink 101. LED based light engine 160, primary ECB 120, peripheral ECB 130, and heat sink 101 are enclosed between mounting plate 102 and housing 103. An optional reflector retainer (not shown) is coupled to housing 103. The reflector retainer is configured to facilitate attachment of different reflectors to the LED based illumination device 200.

In some embodiments, it is advantageous to separate the electronic functionality of LCDIM 110 across two or more electrical circuit boards, as depicted in FIG. 8, to minimize logistical complexity. For example, in a network of LED based illumination devices, certain devices may include different functionality than others. Common functionality is included on the primary ECB associated with each device. In this manner each manufactured device includes the same primary ECB. However, differing functionality is included in a different peripheral ECB. In this manner, one of more different devices may include different peripheral ECBs.

Many different configurations may be contemplated, however, in general, the electronic functionality of LCDIM 110 as described herein may be distributed across any number of components in any suitable manner.

In the embodiment depicted in FIG. 2, LED driver 121 is configured to supply power to one or more LEDs of the LED based light engine 160 over a wired connection 124 between LCDIM 110 and LED based light engine 160. In one embodiment, LED driver 121 is a direct current to direct current (DC/DC) power converter. The DC/DC power converter receives electrical power signals 111 (e.g., 48 Volt supply voltage) supplied to LCDIM 110. The electrical power signals 111 are processed by the DC/DC power converter to generate electrical current 125 supplied to the LEDs of LED based light engine 160. In some other embodiments, driver 121 is configured as an AC/DC power converter configured to convert AC input power signals to DC current signals supplied to the LEDs of LED based light engine 160. In some other embodiments, driver 121 is configured as an AC/AC power converter configured to convert AC input power signals to AC current signals supplied to the LEDs of LED based light engine 160 (e.g., when LED based light engine 160 includes AC LEDs).

In another aspect, LCDIM 110 includes a power converter 123 configured to supply low voltage electrical power signals to the components of LCDIM 110. In this manner, electrical power signals 111 can be used to supply electrical power to driver 121 and electrical power to the low voltage components of LCDIM 110 after power conversion by power converter 123. In some embodiments, power converter 123 is a DC/DC power converter that steps down the voltage of electrical power signals 111 to a low voltage range (e.g., less than five volts) suitable for powering the electronic circuitry of LCDIM 110.

LCDIM 110 includes a wireless communications interface. In some embodiments the wireless communications interface is configured to transmit and receive communications signals 138 (e.g., signals 51 and 52). The wireless communications interface includes a wireless transceiver 129 operable in accordance with a wireless communications protocol, and one or more associated antennas 136 mounted to LED based illumination device 100. Any suitable wireless communications protocol may be contemplated, (e.g., Bluetooth Smart, Bluetooth Low Energy, 802.11, Zigbee, cellular modem, etc.).

In some embodiments, one or more antennas are mounted to the external facing surface(s) of LED based illumination device 100 to maximize communication efficiency between LED based illumination device 100 and a remotely located communications device (e.g., another LED based illumination device, a sensor module, a mobile phone, a router, or other digital system). In some embodiments, an antenna is integrated into the peripheral ECB 130. In some other embodiments, the antenna is integrated into the primary ECB 120. In some other embodiments, the antenna is integrated into housing 103, for example, by molding the antenna into the housing structure or attaching the antenna to a surface of the housing structure. In some other embodiments, the antenna is integrated into the mounting board of the LED based light engine 160.

As depicted in FIG. 2, LCDIM 110 includes an internal communications bus 128 coupled to various components including processor 122, memory 126, timer 127, power converter 123, transceiver 129, and driver 121.

In a further aspect, memory 126 stores identification data, operational data such as temperature history, current history, etc. For example, an identification number, a network security key, commissioning information, etc. may be stored on memory 126.

In another further aspect, LCDIM 110 includes processor readable instructions stored on memory 126 that cause processor 122 to 1) receive wireless signal 51 from sensor module 50 that includes an indication of the latency associated with the recognition of the triggering event and the communication of signal 51, 2) determine a delay time to trigger a lighting control event based a difference between the latency and a desired delay time between the triggering event and the initiation of the lighting control response, and 3) transmit a command signal that initiates the lighting control response to a power converter after the delay time has elapsed (e.g., as measured by timer 127). As depicted in FIG. 2, driver 121 is configured to supply an electrical current 125 to LED based light engine 160 in response to a command signal communicated over bus 128. As depicted in FIG. 2, the desired delay time between the triggering event and the lighting control response is stored in memory 126. It should be understood that the processor 122 may be one or more processors communicating with each other. For example, one processor may receive and decode the signal from the sensor module 50, while a second processor may control the light response, e.g., turning the LED driver on or off, by transmitting the command signal.

In some embodiments, the lighting control response is determined based at least in part on the indication of an identity of the sensor module. By way of non-limiting example, the lighting control response may include any of a fade-on rate, a target intensity level, a persistence time, and a fade-off rate.

In another further aspect, LCDIM 110 includes processor readable instructions stored on memory 126 that cause processor 122 to receive wireless signal 51 from sensor module 50 and wirelessly communicate signal 52 over transceiver 129. The processor readable instructions stored on memory 126 also cause processor 122 to determine the elapsed time between detection of the triggering event by sensor module 50 and the communication of signal 52 by determining the sum of the latency associated with communication of the triggering event by sensor module 50 and the time elapsed between the receiving of signal 51 and the transmitting of signal 52.

Figure 3:
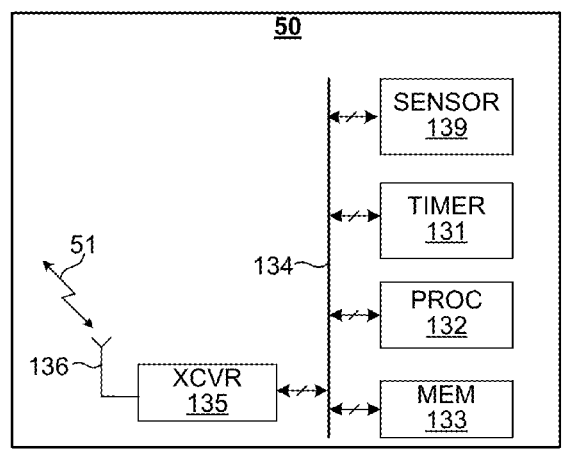
FIG. 3 depicts an exemplary sensor module that may be included in the LED based illumination device.

FIG. 3 depicts an exemplary sensor module 50 that includes an environmental sensor 139, a timer 131, a processor 132, a radio frequency transceiver 135, and a memory 133, configured to communicate over bus 134.

Sensor module 50 includes processor readable instructions stored on memory 133 that cause processor 132 to recognize a triggering event sensed by sensor 139 and communicate a signal 51 indicative of an identity of the sensor module 50 and a time elapsed between the recognition of the triggering event and the transmission of signal 51 (e.g., as measured by timer 131). By way of non-limiting example, the indication of the identity of the sensor module includes any of a sensor identification number, an indication of a group of which the sensor module is a part, an indication of the type of sensor, an indication of an address of the sensor module on a wireless network, and an indication of the triggering event.

Sensor module 50 includes a wireless communications interface configured to transmit communications signals from sensor module 50. The wireless communications interface includes a wireless transmitter 135 operable in accordance with a wireless communications protocol, and one or more associated antennas mounted to sensor module 50. In one example, sensor module 50 is operable in accordance with the Bluetooth Smart protocol to broadcast signal 51 as described herein. In one specific implementation, for example, sensor module 50 is operable in accordance with an iBeacon protocol to broadcast information with which location may be determined.

By way of non-limiting example, sensor 139 may include any of a presence sensor, a light sensor, an acoustic sensor, a vibration sensor, a humidity sensor, a pressure sensor, a gas monitoring sensor (e.g., CO2, CO, etc.), and any associated interface electronics. Sensor 139 may include one or more occupancy sensors, motion sensors, ambient light sensors, temperature sensors, cameras, microphones, visual indicators such as low power LEDs, ultrasonic sensors, and photodetectors.

In some examples, sensor module 50 is configured to transmit (and LCDIM 110 is configure to receive) a communication signal that indicates the identity of the sensor module and an indication that a triggering event was not detected by the sensor module. This communication may be employed as part of an on-going diagnosis of network health.

In some examples, sensor module 50 is further configured to retransmit a communication signal indicative of a triggering event multiple times. In these embodiments, a subsequent communication signal includes the indication of the identity of the sensor module and an elapsed time since the triggering event was detected by the sensor module. It follows that at each successive transmission, a greater amount of time elapses from the triggering event. In some embodiments, the communication signal includes an indication of the cumulative number of successive communications from the sensor module indicating the triggering event detected by the sensor module (i.e., retransmission number).

In some embodiments, the communication signals of lighting control network 10 are encrypted.

Figure 10:
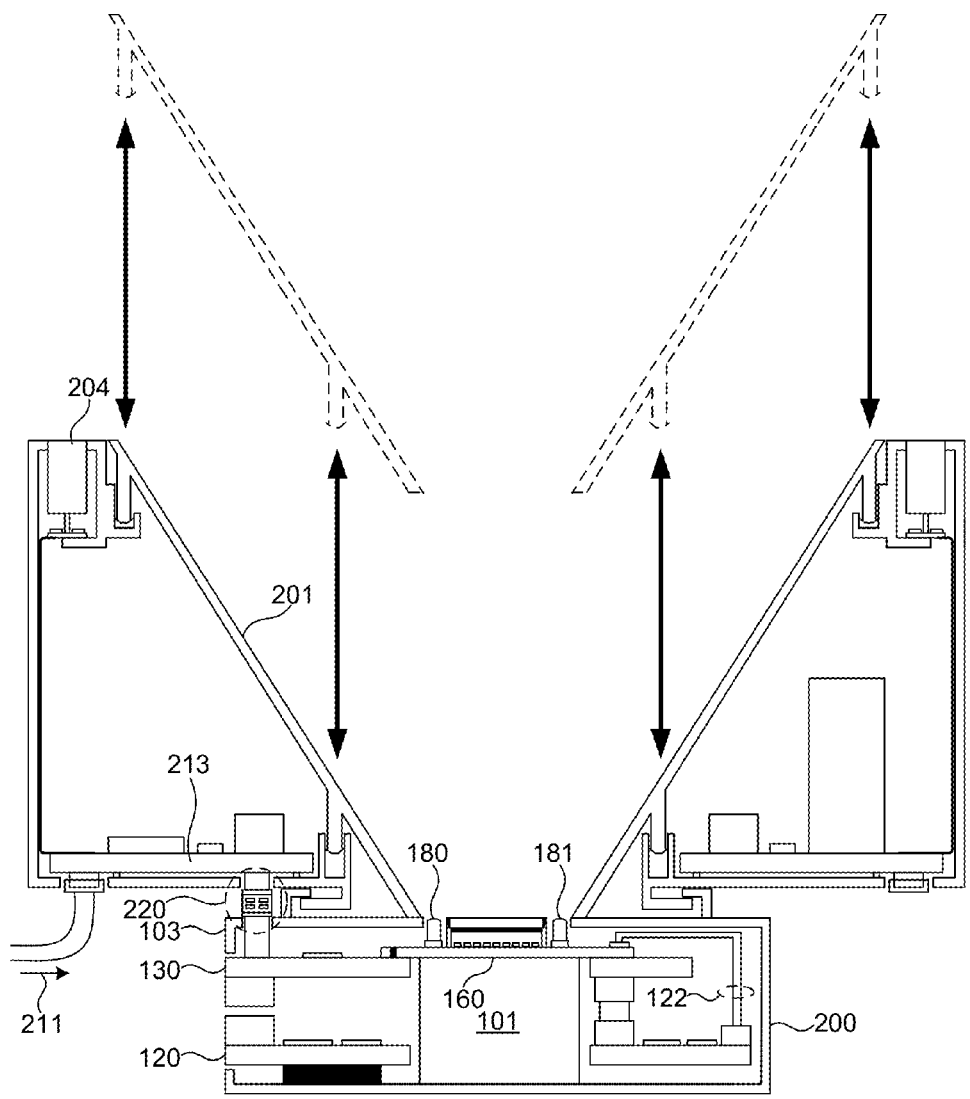
FIG. 10 depicts a cross-sectional illustration of an LED based illumination device including optical sensors located on LED based light engine outside the light conversion cavity.

In some embodiments, it is desirable to locate sensors in areas exposed to light emitted from the LED based light engine 160. FIG. 10 depicts a cross-sectional illustration of an LED based illumination device including optical sensors 180 and 181 located on LED based light engine 160 outside the light conversion cavity. In some other examples, a sensor (e.g., silicon photo diode) is located within the light conversion cavity.

In some other examples, sensors may be mounted to a reflector assembly that is electrically coupled to peripheral ECB 130 (e.g., via an electrical connector, contacts, or inductively coupled).

FIG. 10 depicts a reflector assembly including sensing capability detachably mounted to an LED based illumination device in one embodiment. The reflector housing includes a reflector 201, sensors 204, and an electronics interface board 213. In the depicted embodiment, the reflector housing includes an outward facing surface. In other words, at least one surface of the reflector housing faces away from the light source of LED based illumination device 200 and toward the environment illuminated by LED based illumination device 200. Sensors (e.g., sensor 204) are mounted in the reflector housing along the outward facing surface. In this manner, the sensors are sensitive to physical signals directed toward LED based illumination device 200. Signals generated by the sensors are communicated to an electrical interface board 213 coupled to the reflector housing for further processing and communication to LED based illumination device. The sensor messages may be sent from the reflector 201 to the LED illumination device 200 wirelessly using a protocol such as Bluetooth Smart. In this manner, the sensor messages may be received not only by the local LED illumination device 200, but by nearby LED illumination devices as well.

Reflector 201 includes an input port configured to receive a first amount of light emitted from the LED based illumination device 200 and an output port through which light passes toward the environment. The reflecting surface(s) of reflector 201 are configured to redirect at least a portion of the light emitted from the LED based illumination device toward the output port.

In the depicted embodiment, the reflector assembly is communicatively coupled to peripheral ECB 130 of the LED based illumination device by a connector 220, and the reflector assembly is configured to transmit and receive communications signals to and from the peripheral ECB 130. In one embodiment, the electronics interface board 213 is configured to route communications between the sensor 204 and the LED based illumination device over a wired interface, such as a four pin interface including two power pins and two communication pins (e.g. I2C interface). In some other embodiments, electrical interface board 213 includes a coiled conductor and peripheral ECB 130 includes a complementary coiled conductor. The conductors are configured to form an inductive coupling operable in accordance with a near field communications (NFC) protocol. In this manner, signals may be passed between the reflector assembly and LED based illumination device.

Many different types of sensors may be mounted to the reflector assembly. By way of non-limiting example, one or more occupancy sensors, ambient light sensors, temperature sensors, cameras, microphones, visual indicators such as low power LEDs, ultrasonic sensors, vibration sensors, pressure sensors, and photodetectors may be mounted to the reflector assembly.

In some embodiments, additional sensors may be electrically coupled to the reflector assembly and data signals 211 generated by these external sensors are communicated to the electronic interface board 213. External sensors may also be directly connected to ECB 130 or ECB 120 in LED based illumination device 200. The collected data may then be communicated to LED based illumination device as described hereinbefore.

In general, any outwardly facing surface of LED based illumination device 100 is suitable for any sensor collecting data from the environment illuminated by LED based illumination device 100. However, in some embodiments, one or more sensors may be located in areas of the LED based illumination device 100 that are not necessarily exposed to the environment illuminated by LED based illumination device 100. For example, one or more temperature sensors, vibration sensors, and pressure sensors may coupled to peripheral ECB 130 or primary ECB 120 to monitor environmental parameters such as temperature, etc., near LED based illumination device 100. For example, a temperature sensor may be mounted close to electronic components of peripheral ECB 130 or primary ECB 120 to monitor operating temperatures to minimize component failure.

Figure 4:
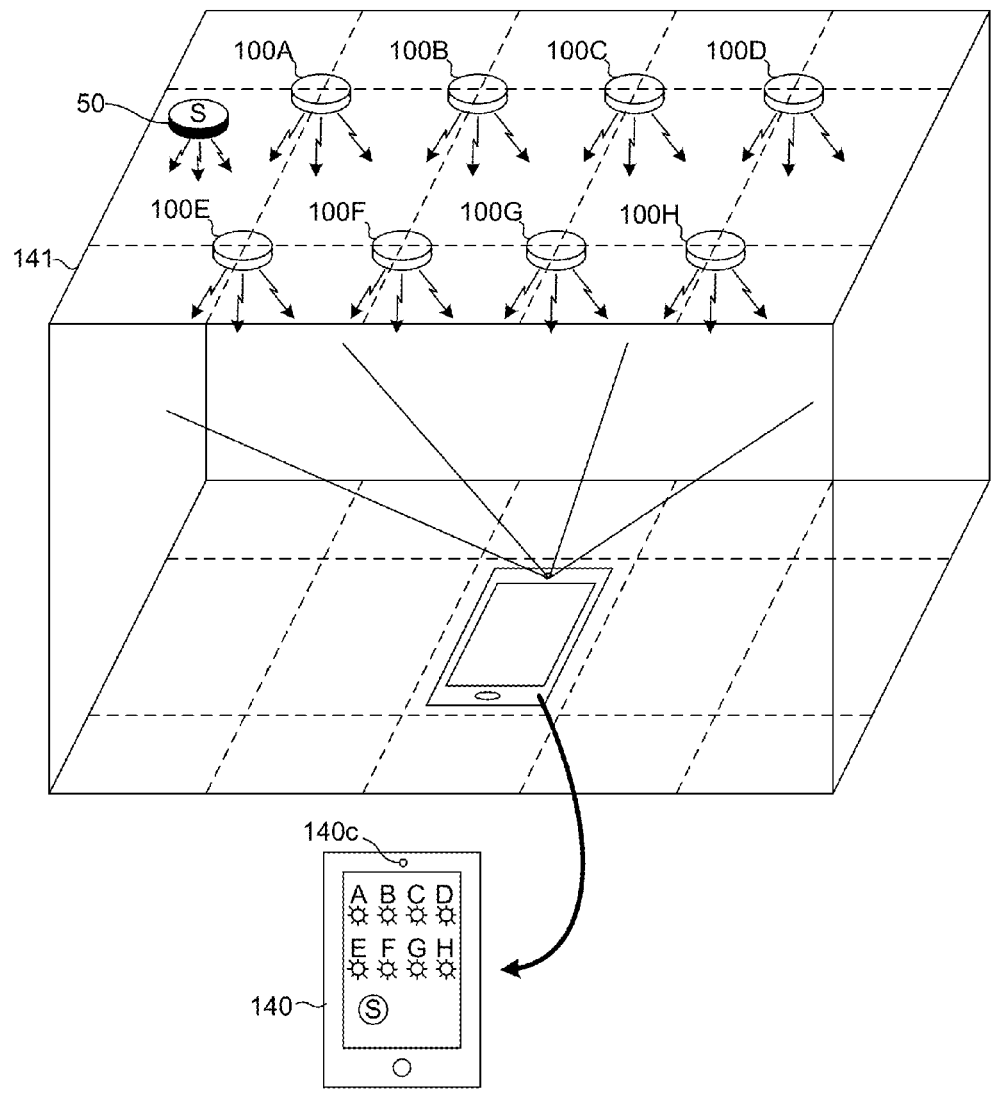
FIG. 4 depicts an environment illuminated by a plurality of LED based illumination device

FIG. 4 depicts an environment 141 illuminated by LED based illumination device 100A-H. In addition, a sensor module 50 is located in environment 141 and is configured to sense a physical property of the environment (e.g., presence, light intensity, motion, etc.). In addition, FIG. 4 depicts a mobile electronics device 140 (e.g., mobile phone, tablet computer, etc.) that includes a camera module 140c and associated software to identify the presence of LED based illumination devices 100A-H. The camera module 140c and associated software may also identify the presence of sensor module 50 within environment 141 as well, e.g., with an LED, such as a near infrared LED on the sensor or by detecting a predetermined modulation of light emitted by one or more of the LED based illumination devices 100A-H.

In one example, it may be desirable to group LED based illumination devices 100A-H and control the light emitted from the LED based illumination device 100A-H based on triggering events sensed by sensor module 50.

In one aspect, mobile communication device 140 is configured to generate and communicate instructions to LED based illumination devices 100A-H that define light control rules that govern the response of each of the LED based illumination devices 100A-H to a signal received from sensor module 50.

Figure 5:
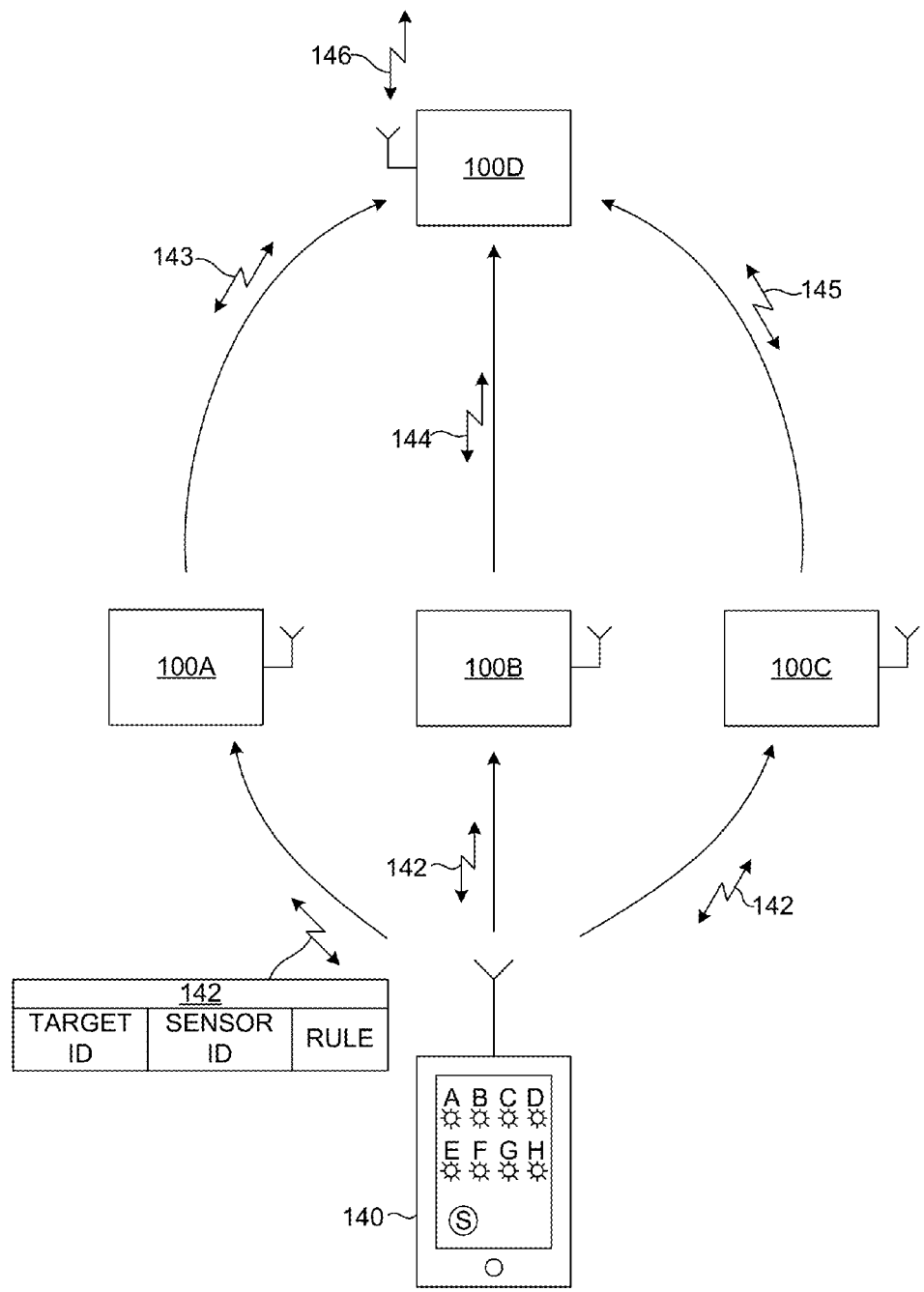
FIG. 5 depicts a lighting control network in which a mobile electronic device broadcasts a signal that includes, e.g., an indication of the identity of sensor, an indication of the identities of each of the LED based illumination devices participating in the group, and at least one lighting control rule.

As depicted in FIG. 5, mobile electronic device 140 broadcasts signal 142. Signal 142 includes an indication of the identity of sensor module 50 (Sensor ID), an indication of the identities of each of the LED based illumination devices participating in the group (e.g., LED based illumination devices 100A-H) (Target ID), and at least one lighting control rule (Rule). The lighting control rule includes at least one parameter that defines at least a portion of the light control response of each LED based illumination device to a communication received from sensor module 50. By way of non-limiting example, a parameter defining at least a portion of the light control response may include any of a fade-on rate, a target intensity level, a persistence time, and a fade-off rate.

As depicted in FIG. 5, signal 142 may not directly reach all of the LED based lighting control devices. In the depicted example, LED based illumination devices 100A-C receive signal 142, and transmit signals 143-145, respectively. Signals 143-145 include the contents of signal 142. In this manner, LED based illumination device 100D receives the programming information contained in signal 142.

Each of the LED based illumination devices 100A-D compare their own identities (e.g., MAC address, network ID, etc.) with the target identities included in signal 142. If there is match, the LED based illumination device writes the sensor identity and light control rule(s) to their respective memories (e.g., memory 126 depicted in FIG. 2). In this manner, each LED based illumination device is configured to respond to communications received from the appropriate sensor modules and respond in accordance with the programmed light control rules.

In this manner, a mobile communication device may be employed to flexibly program groups of LED based illumination devices to respond in a synchronized manner to one or more environmental sensors.

Although, programming information may be communicated to one or more LED based illumination devices by a mobile electronic device, in general, any suitable electronic device (e.g., building management server, networked computer, etc.) may be employed to communicate programming information.

Figure 9:
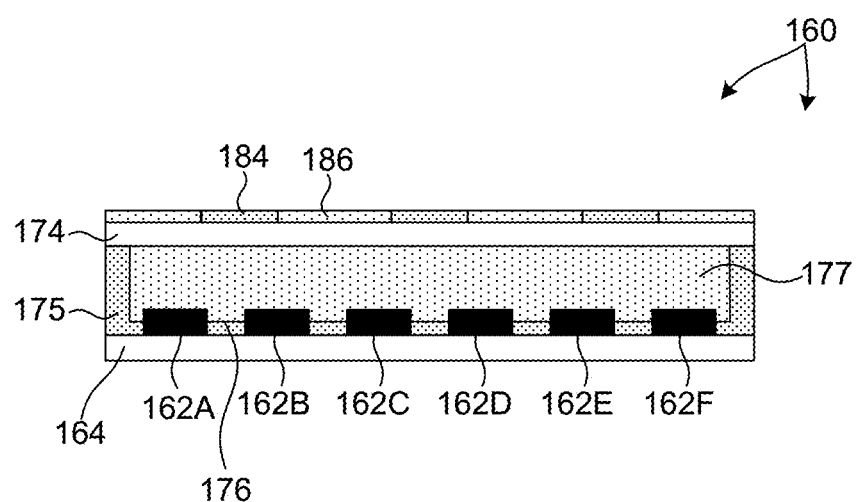
FIG. 9 illustrates a cross-sectional view of an LED based light engine.

FIG. 9 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 9, LED based light engine 160 includes a number of LEDs 162A-F mounted to mounting board 164 in a chip on board (COB) configuration. The spaces between each LED are filled with a reflective material 176 (e.g., a white silicone material). In addition, a dam of reflective material 175 surrounds the LEDs 162 and supports transmissive element 174, which may be, e.g., a plate. The space between LEDs 162 and transmissive element 174 is filled with an encapsulating optically translucent material 177 (e.g., silicone) to promote light extraction from LEDs 162 and to separate LEDs 162 from the environment. In the depicted embodiment, the dam of reflective material 175 is both the thermally conductive structure that conducts heat from transmissive element 174 to LED mounting board 164 and the optically reflective structure that reflects incident light from LEDs 162 toward transmissive element 174.

LEDs 162 can emit different or the same colors, either by direct emission or by phosphor conversion, e.g., where phosphor layers are applied to the LEDs as part of the LED package. The LED based illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the LED based illumination device 100 has a desired color when LEDs 162 are used in combination with wavelength converting materials on transmissive element 174, for example. By tuning the chemical and/or physical (such as thickness and concentration) properties of the wavelength converting materials and the geometric properties of the coatings on the surface of transmissive element 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)AlSiN$_3$:Eu, CaAlSiN$_3$:Eu, CaAlSi(ON)$_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive element 174. In one embodiment a red emitting phosphor 186 such as an alkaline earth oxy silicon nitride covers a portion of transmissive element 174, and a yellow emitting phosphor 184 such as a YAG phosphor covers another portion of transmissive element 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive element 174, and selecting which portions of transmissive element 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive element 174. By way of example, a red emitting phosphor 186 may be patterned on different areas of the transmissive element 174 and a yellow emitting phosphor 184 may be patterned on other areas of transmissive element 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive element 174 may be constructed from a suitable optically transmissive material (e.g., sapphire, quartz, alumina, crown glass, polycarbonate, and other plastics). Transmissive element 174 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive element 174 directly to the surface of the LED 162. In this manner, the direct thermal contact between transmissive element 174 and LEDs 162 promotes heat dissipation from LEDs 162. In some other embodiments, the space between mounting board 164 and transmissive element 174 may be filled with a solid encapsulate material. By way of example, silicone may be used to fill the space. In some other embodiments, the space may be filled with a fluid to promote heat extraction from LEDs 162.

In the embodiment illustrated in FIG. 9, the surface of patterned transmissive element 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple transmissive element 174 to LEDs 162 in any of the embodiments described herein.

In some embodiments, multiple, stacked transmissive layers are employed. Each transmissive layer includes different wavelength converting materials. For example, a transmissive layer including a wavelength converting material may be placed over another transmissive layer including a different wavelength converting material. In this manner, the color point of light emitted from LED based illumination device 100 may be tuned by replacing the different transmissive layers independently to achieve a desired color point. In some embodiments, the different transmissive layers may be placed in contact with each other to promote light extraction. In some other embodiments, the different transmissive layers may be separated by a distance to promote cooling of the transmissive layers. For example, airflow may by introduced through the space to cool the transmissive layers.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the board 164 and the bottom of the board 164. In one example, the bottom of mounting board 164 may be thermally coupled to a heat sink, or a lighting fixture and/or other mechanisms to dissipate the heat, such as a fan. In some embodiments, the mounting board 164 conducts heat to a heat sink thermally coupled to the top of the board 164. Mounting board 164 may be an FR4 board, e.g., that is 0.5 mm thick, with relatively thick copper layers, e.g., 30 micrometers to 100 micrometers, on the top and bottom surfaces that serve as thermal contact areas. In other examples, the board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 11:
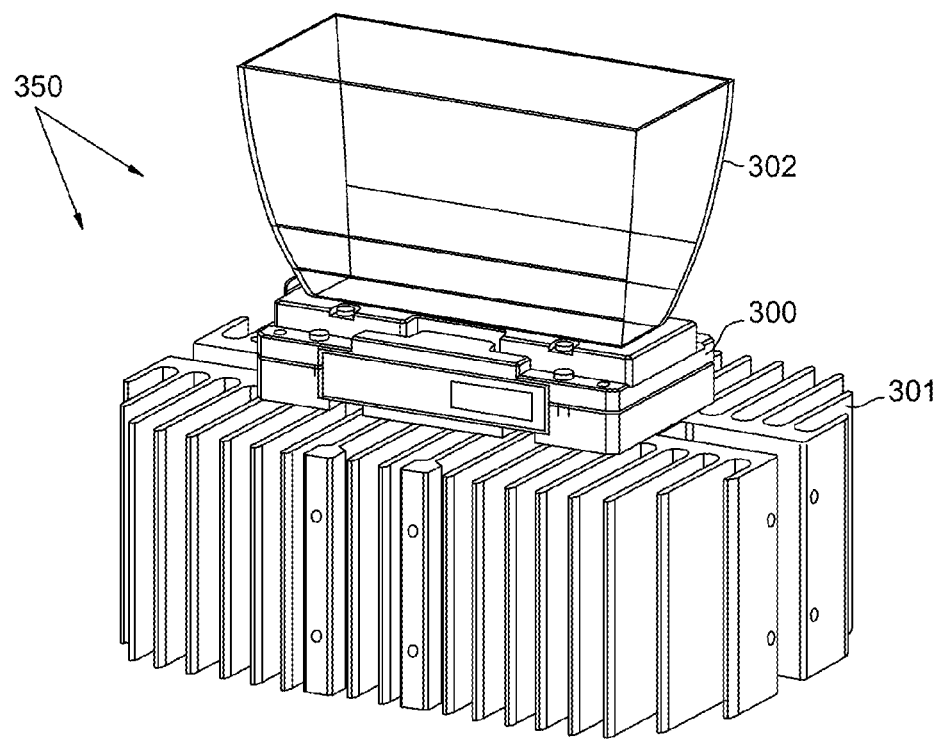
FIG. 11 depicts a perspective view of a luminaire including an LED based illumination device with a rectangular form factor.
Figure 12:
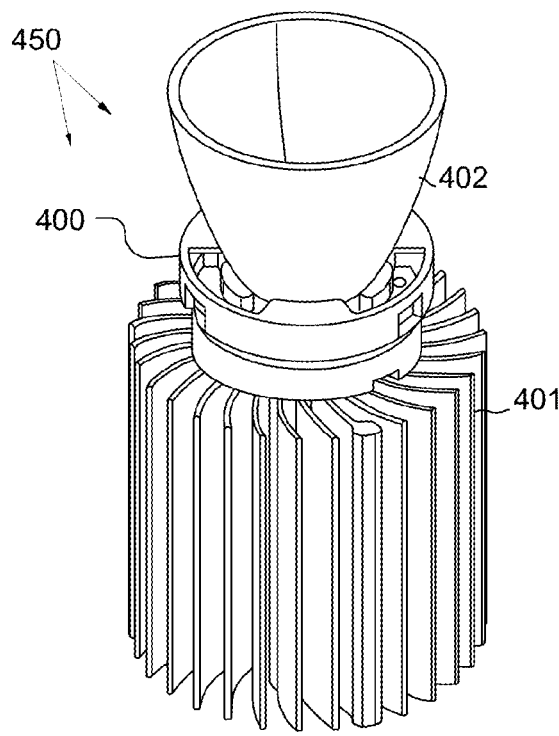
FIG. 12 depicts a perspective view of a luminaire including an LED based illumination device with a circular form factor.
Figure 13:
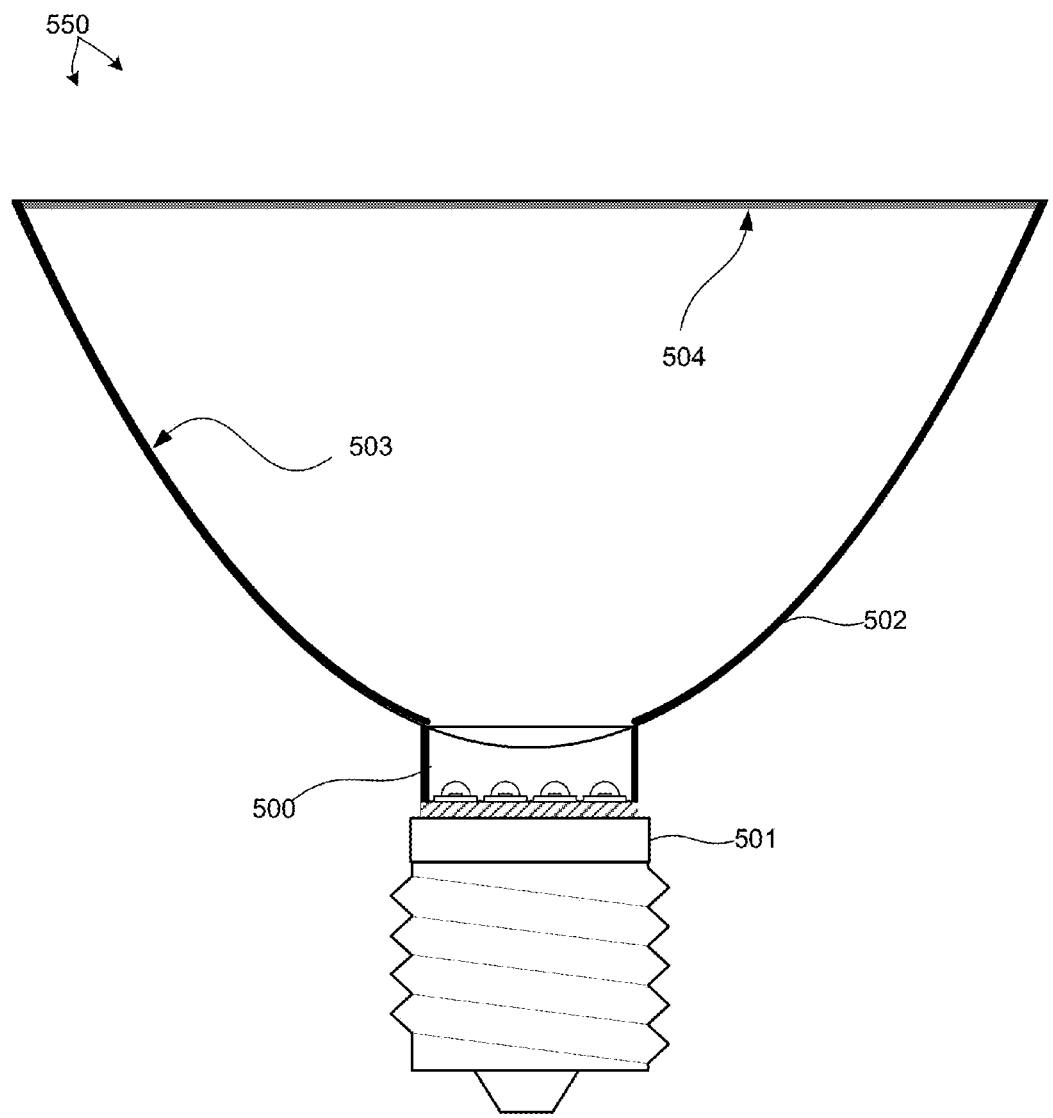
FIG. 13 depicts a side view of a luminaire including an LED based illumination device integrated into a retrofit lamp device.

FIGS. 11, 12, and 13 illustrate three exemplary luminaires. Luminaire 350 illustrated in FIG. 11 includes an LED based illumination device 300 with a rectangular form factor. The luminaire 450 illustrated in FIG. 12 includes an LED based illumination device 400 with a circular form factor. The luminaire 550 illustrated in FIG. 13 includes an LED based illumination device 500 integrated into a retrofit lamp device. These examples are for illustrative purposes. Examples of LED based illumination devices of general polygonal and elliptical shapes may also be contemplated.

Luminaires 350, 450, and 550 include LED based illumination devices 300, 400, and 500, reflectors 302, 402, and 502, and light fixtures 301, 401, and 501, respectively. As depicted, the light fixtures include a heat sink capability, and therefore may be sometimes referred to as a heat sink. However, the light fixtures may include other structural and decorative elements (not shown). The reflectors are mounted to the LED based illumination devices to collimate or deflect light emitted from each LED based illumination device. Reflectors may be made from a thermally conductive material, such as a material that includes aluminum or copper and may be thermally coupled to each LED based illumination device. Heat flows by conduction through the LED based illumination device and the thermally conductive reflector. Heat also flows via thermal convection over the reflector. Reflectors may be compound parabolic concentrators, where the concentrator is constructed of or coated with a highly reflecting material. Optical elements, such as a diffuser or reflector may be removably coupled to an LED based illumination device, e.g., by means of threads, a clamp, a twist-lock mechanism, or other appropriate arrangement. As illustrated in FIG. 13, the reflector 502 may include sidewalls 503 and a window 504 that are optionally coated, e.g., with a wavelength converting material, diffusing material or any other desired material.

As depicted in FIGS. 11, 12, and 13, the LED based illumination device is mounted to a heat sink. The heat sink may be made from a thermally conductive material, such as a material that includes aluminum or copper and may be thermally coupled to an LED based illumination device. Heat flows by conduction through an LED based illumination device and the thermally conductive heat sink. Heat also flows via thermal convection over the heat sink. Each LED based illumination device may be attached to a heat sink by way of screw threads to clamp the LED based illumination device to the heat sink. To facilitate easy removal and replacement, the LED based illumination device may be removably coupled to the heat sink, e.g., by means of a clamp mechanism, a twist-lock mechanism, or other appropriate arrangement. The LED based illumination device includes at least one thermally conductive surface that is thermally coupled to the heat sink, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heat sink contact area should be used. Using a larger heat sink may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the LED based illumination device.

Although certain specific embodiments are described above for instructional purposes, the teachings of this patent document have general applicability and are not limited to the specific embodiments described above. For example, it is understood that the Bluetooth Smart protocol and the Bluetooth Low Energy protocol are sometimes referred to interchangeably in common industry parlance, and their usage as described herein is provided by way of non-limiting example, as many other wireless communication protocols may be contemplated within the scope of this patent document. Accordingly, various modifications, adaptations, and combinations of various features of the described embodiments can be practiced without departing from the scope of the invention as set forth in the claims.

What is claimed is:

1. A light control and data interface module, comprising:
   one or more processors;
   a transceiver configured to receive a first communication signal from one or more sensor modules, the first communication signal including an indication of an identity of the one or more sensor modules and a first elapsed time since a triggering event was detected by the one or more sensor modules; and
   a non-transitory, computer readable medium storing instructions that when executed by the one or more processors cause the one or more processors to:
   receive the first communication signal from the transceiver;

determine a delay time to trigger a lighting control response based on a difference between a desired delay time to trigger the lighting control response and the first elapsed time; and transmit a command signal that implements the lighting control response to a power converter coupled to the light control and data interface module after the delay time to trigger the lighting control response has elapsed, wherein the power converter is configured to supply an electrical current to an LED based light engine in response to the command signal.

2. The light control and data interface module of claim 1, further comprising:

an amount of memory storing the desired delay time to trigger a lighting control event, wherein the desired delay time to trigger the lighting control event is a desired elapsed time between the triggering event detected by the one or more sensor modules and a change in an amount of light emitted by the LED based light engine.

3. The light control and data interface module of claim 1, wherein the non-transitory, computer readable medium also stores instructions that when executed by the one or more processors cause the light control and data interface module to:

transmit a second communication signal from the transceiver of the light control and data interface module, the second communication signal including the indication of the identity of the one or more sensor modules and a second elapsed time since the triggering event was detected by the one or more sensor modules, wherein the second elapsed time is a sum of the first elapsed time and a time elapsed between the receiving of the first communication signal and the transmitting of the second communication signal.

4. The light control and data interface module of claim 1, wherein the indication of the identity of the one or more sensor modules includes any of a sensor identification number, an indication of an address of the one or more sensor modules on a wireless network, and an indication of the triggering event.

5. The light control and data interface module of claim 4, wherein the indication of the identity of the one or more sensor modules further includes an indication of a group of which the one or more sensor modules is a part and an indication of a type of sensor.

6. The light control and data interface module of claim 1, wherein the one or more sensor modules is any of a presence sensor, a light sensor, an acoustic sensor, a motion sensor, a pressure sensor, a humidity sensor, a gas monitoring ($CO_2$, CO, etc.) sensor and a vibration sensor.

7. The light control and data interface module of claim 1, wherein the transceiver is further configured to receive a second communication signal from the one or more sensor modules, the second communication signal including the indication of the identity of the one or more sensor modules and an indication that a triggering event was not detected by the one or more sensor modules.

8. The light control and data interface module of claim 1, wherein the transceiver is further configured to receive a second communication signal from the one or more sensor modules, the second communication signal including the indication of the identity of the one or more sensor modules and a second elapsed time since the triggering event was detected by the one or more sensor modules, wherein the second elapsed time is greater than the first elapsed time.

9. The light control and data interface module of claim 8, wherein the second communication signal also includes an indication of a cumulative number of successive communications from the one or more sensor modules indicating the triggering event detected by the one or more sensor modules.

10. The light control and data interface module of claim 1, wherein the first communication signal is encrypted.

11. The light control and data interface module of claim 1, wherein the non-transitory, computer readable medium also stores instructions that when executed by the one or more processors cause the one or more processors to:

determine the lighting control response based at least in part on the indication of the identity of the one or more sensor modules.

12. The light control and data interface module of claim 11, wherein the lighting control response includes any of a fade-on rate, a target intensity level, a persistence time, and a fade-off rate.

13. The light control and data interface module of claim 11, wherein the non-transitory, computer readable medium also stores instructions that when executed by the one or more processors enable the one or more processors to:

receive the indication of the identity of the one or more sensor modules, an identity of the light control and data interface module, and at least one light control rule including at least one parameter that defines at least a portion of the lighting control response.

14. The light control and data interface module of claim 13, wherein the indication of the identity of the one or more sensor modules, the identity of the light control and data interface module, and the at least one light control rule are received from a mobile electronic device.

15. The light control and data interface module of claim 1, wherein the first elapsed time since the triggering event was detected by the one or more sensor modules is determined based at least in part on a predetermined estimate of a communication latency between the one or more sensor modules and the light control and data interface module.

16. The light control and data interface module of claim 1, wherein the first elapsed time since the triggering event was detected by the one or more sensor modules is determined based at least in part on a number of received packets buffered in the light control and data interface module.

17. An LED based illumination device, comprising:

an LED based light engine configured to generate an amount of illumination light: and light control and data interface module, comprising:
one or more processors;
a transceiver is a radio frequency configured to receive a first communication signal from one or more sensor modules, the first communication signal including an indication of an identity of the one or more sensor modules and a first elapsed time since a triggering event was detected by the one or more sensor modules; and
a non-transitory, computer readable medium storing instructions that when executed by the one or more processors cause the one or more processors to:
receive the first communication signal from the transceiver;
determine a delay time to trigger a lighting control response based on a difference between a desired delay time to trigger the lighting control response and the first elapsed time; and
transmit a command signal that implements the lighting control response to a power converter coupled to the light control and data interface module after the delay time to trigger the lighting control response has elapsed, wherein the power converter is configured to supply an electrical current to the LED based light engine in response to the command signal.

* * * * *